(12) United States Patent
Kimata et al.

(10) Patent No.: US 11,299,070 B2
(45) Date of Patent: Apr. 12, 2022

(54) ELECTRIC SEAT SLIDE DEVICE

(71) Applicant: TF-METAL Co., Ltd., Kosai (JP)

(72) Inventors: Toshihiro Kimata, Kosai (JP); Hiroaki Nakajima, Kosai (JP); John Newberry, Farmington Hills, MI (US); Madhusudana Darinayakanapalya Sudheendra, Farmington Hills, MI (US)

(73) Assignee: TF-METAL CO., LTD., Shizuoka (JP)

( * ) Notice: Subject to any disclaimer, the term of this patent is extended or adjusted under 35 U.S.C. 154(b) by 13 days.

(21) Appl. No.: 16/919,436

(22) Filed: Jul. 2, 2020

(65) Prior Publication Data

US 2021/0061136 A1 Mar. 4, 2021

(30) Foreign Application Priority Data

Aug. 28, 2019 (JP) .............................. JP2019-155731

(51) Int. Cl.
*B60N 2/06* (2006.01)
*B60N 2/07* (2006.01)
*B60N 2/02* (2006.01)

(52) U.S. Cl.
CPC ........... *B60N 2/067* (2013.01); *B60N 2/0232* (2013.01); *B60N 2/0727* (2013.01); *B60N 2002/0236* (2013.01)

(58) Field of Classification Search
CPC .......... B60N 2/067; B60N 2/06; B60N 2/062; B60N 2/0232; B60N 2/08; B60N 2/0862; B60N 2/0868; B60N 2/0727; B60N 2/0722; B60N 2002/0236

USPC ................................ 248/424, 428, 429, 430
See application file for complete search history.

(56) References Cited

U.S. PATENT DOCUMENTS

| | | | | |
|---|---|---|---|---|
| 4,645,159 A * | 2/1987 | Terada | ................. | B60N 2/0232 248/429 |
| 4,805,866 A * | 2/1989 | Aihara | ................. | B60N 2/0232 248/429 |
| 6,820,851 B2 * | 11/2004 | Mochizuki | ............. | B60N 2/067 248/429 |
| 8,061,756 B2 * | 11/2011 | Kimata | ................ | B60N 2/0715 296/65.17 |
| 10,363,838 B2 * | 7/2019 | Runde | .................... | B60N 2/123 |
| 11,052,788 B2 * | 7/2021 | Sprenger | ................ | B60N 2/067 |
| 2009/0236488 A1 * | 9/2009 | Koga | .................... | B60N 2/0705 248/429 |

(Continued)

FOREIGN PATENT DOCUMENTS

JP 2009227152 A 10/2009

*Primary Examiner* — Nkeisha Smith
(74) *Attorney, Agent, or Firm* — Nath, Goldberg & Meyer; Jerald L. Meyer

(57) ABSTRACT

A screw shaft attached to the upper rail is screwed into a nut member attached to the lower rail. When the screw shaft is rotated with respect to the nut member by a drive unit, the screw shaft is moved rearward and forward with respect to the nut member, and the upper rail is also moved rearward and forward with respect to the lower rail. A fixing nut is fixed to an inner surface of the lower rail behind the nut member, and a stopper bolt is fastened to the fixing nut from below the lower rail. When the upper rail moves forward, a stopper portion provided at a tip of the stopper bolt contacts the stopper plate to restrict an excessive forward movement of the upper rail.

7 Claims, 4 Drawing Sheets

(56) References Cited

U.S. PATENT DOCUMENTS

2015/0298581 A1* 10/2015 Nagata ................. B60N 2/0232
　　　　　　　　　　　　　　　　　　　　　　　 248/429

* cited by examiner

ELECTRIC SEAT SLIDE DEVICE

BACKGROUND

1. Technical Field

The present invention relates to an electric seat slide device that electrically moves (slides) a seat rearward and forward.

2. Description of the Related Art

An electric seat slide device moves a nut member attached to a lower rail relative to a screw shaft by rotation of the screw shaft attached to an upper rail with motor, thereby the upper rail moves relative to the lower rail (see JP 2009-227152 A). The electric seat slide device has a tab formed by partially cutting-and-raising of a side wall of the upper rail. The tab is brought into contact with the nut member to serve as a stopper to restrict a moving range of the upper rail.

SUMMARY OF THE INVENTION

The range of movement of the upper rail relative to the lower rail often differs depending on vehicle seats on which the electric seat slide device is mounted. Therefore, it is necessary to change the moving range of the upper rail. However, when the stopper for restricting the moving range of the upper rail is the aforementioned tab formed by cutting-and-raising from the side wall of the upper rail, the stopper may have insufficient mechanical strength. In this case, the reliability of the stopper is likely to be lowered.

Therefore, the present invention is aimed to make changeable the relative movement range between the upper rail and the lower rail, and to obtain a sufficient mechanical strength of the stopper for restricting the movement range.

An electric seat slide device according to the present invention includes: at least one rail body including a first rail and a second rail that extend in a longitudinal direction along a front-rear direction of a vehicle, one of the first rail and the second rail movably provided in the longitudinal direction relative to the other of the first rail and the second rail; a screw shaft rotatably attached to the first rail and extending along the longitudinal direction of the first rail; a drive unit attached to the first rail and configured to rotationally drive the screw shaft; at least one stopper member attached to the first rail and arranged orthogonal to the screw shaft; a nut member attached to the second rail and screwed to the screw shaft; a fixing nut attached to an inner surface of the second rail facing the first rail, the fixing nut being located between the at least one stopper member and the nut member in a state where the first rail and the second rail are assembled to each other; and a stopper bolt inserted from an outside of the second rail which is opposite to an inside thereof facing the first rail, the stopper bolt being fastened to the fixing nut. An end portion of the fixing nut facing the first rail is separated in a vertical direction from an end portion of the at least one stopper member facing the second rail. The stopper bolt includes a stopper portion that comes into contact with the at least one stopper member when the first rail moves in an axial direction of the screw shaft relative to the second rail together with the screw shaft by a rotation of the screw shaft.

According to the present invention, the stopper bolt fastened to the fixing nut includes the stopper portion which abuts on the stopper member. Therefore, it is possible to easily change the relative movement range between the upper rail and the lower rail and to increase the mechanical strength of the stopper. Further, the fixing nut and the stopper member are located at positions facing each other with a gap in the vertical direction. Therefore, even when the fixing nut is attached to the lower rail in advance, is possible to perform assembling of the electric seat slide device which is the same as a case without the fixing nut. Accordingly, even if the relative movement range is changed, the electric seat slide device can be assembled on the same assembly line.

DESCRIPTION OF THE EMBODIMENTS

Hereinafter, embodiments of the present invention will be described with reference to the drawings. In the following description, a term "front" represents a left side of FIGS. 1 and 2 and also a front FR, side of a vehicle. A term "rear" represents a right side of FIGS. 1 and 2 and also a rear RR side of the vehicle. Further, a term "left and right" is a left-right direction when viewed the front of the vehicle from the rear thereof.

Figure 1:
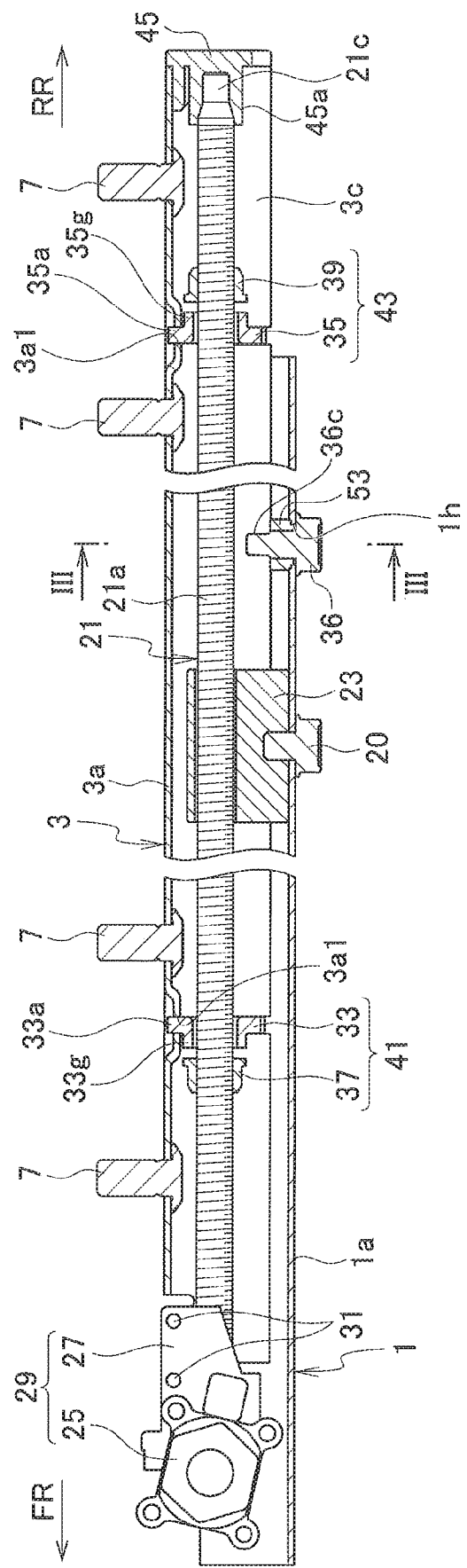
FIG. 1 is a cross-sectional view of an electric seat slide device according to an embodiment of the present invention.
Figure 2:
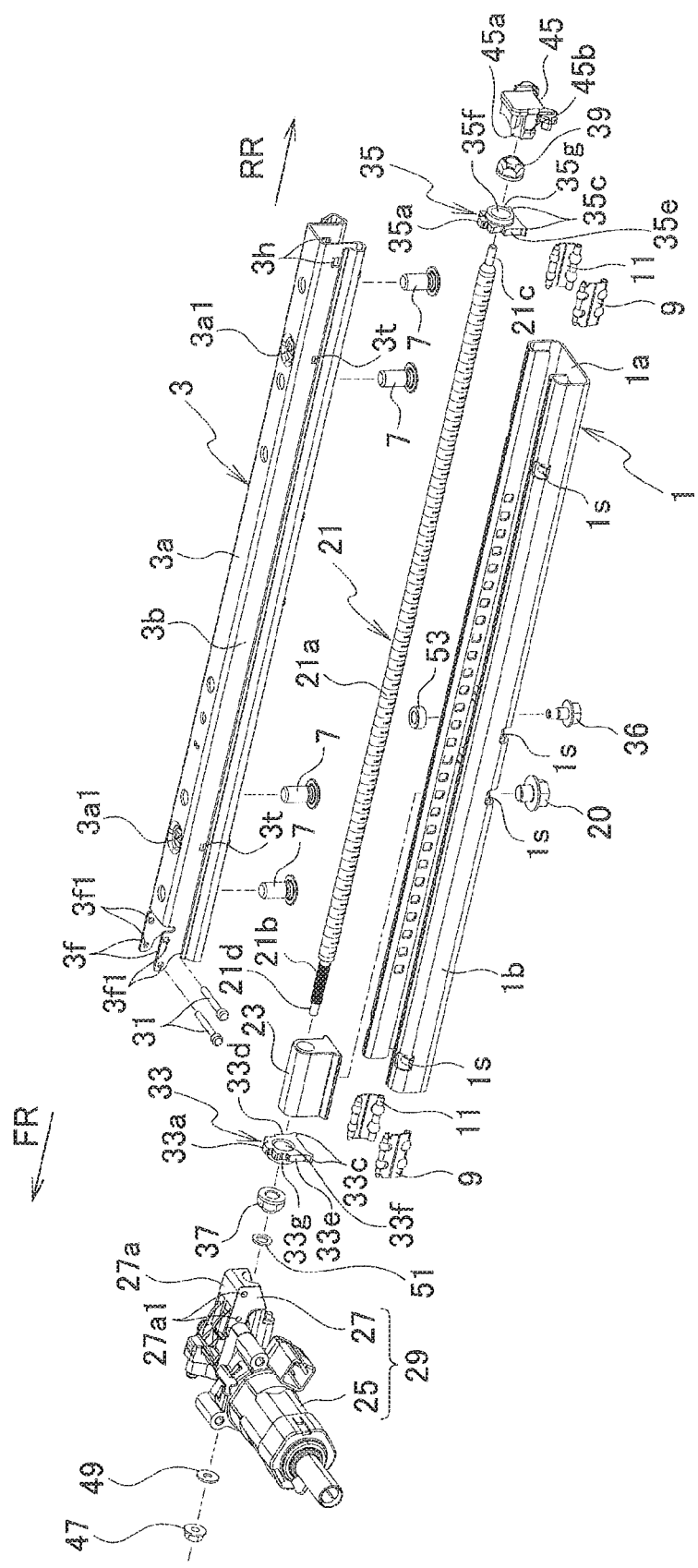
FIG. 2 is an exploded perspective view of the electric seat slide device.

FIG. 1 is a cross-sectional view of an electric seat slide device according to an embodiment of the present invention. FIG. 2 is an exploded perspective view of the electric seat slide device. The electric seat slide device includes a rail body including a first rail and a second rail. The first rail and the second rail extend in their longitudinal direction along a front-rear direction of the vehicle. One of the first rail and the second rail is movable (slidable) in their longitudinal direction relative to the other of the first rail and the second rail. As understood from the following description, a screw shaft is attached to the first rail, and a screw nut screwed to the screw shaft is attached to the second rail. In the present embodiment as described below, the upper rail 3 serves as the first rail, and the lower rail 1 serves as the second rail.

The lower rail 1 as the second rail is fixed to a floor of a vehicle body. The lower rail 1 extends along the front-rear direction of the vehicle. The upper rail 3 as the first rail moves relative to the lower rail 1 inside the lower rail 1 along a longitudinal direction of the lower rail 1. The upper rail 3 is attached to a lower surface of a seat (not shown) such as a vehicle seat. Therefore, the seat can move in the front-rear direction together with the upper rail 3 with respect to the lower rail 1 attached to the floor of the vehicle body.

Figure 3:
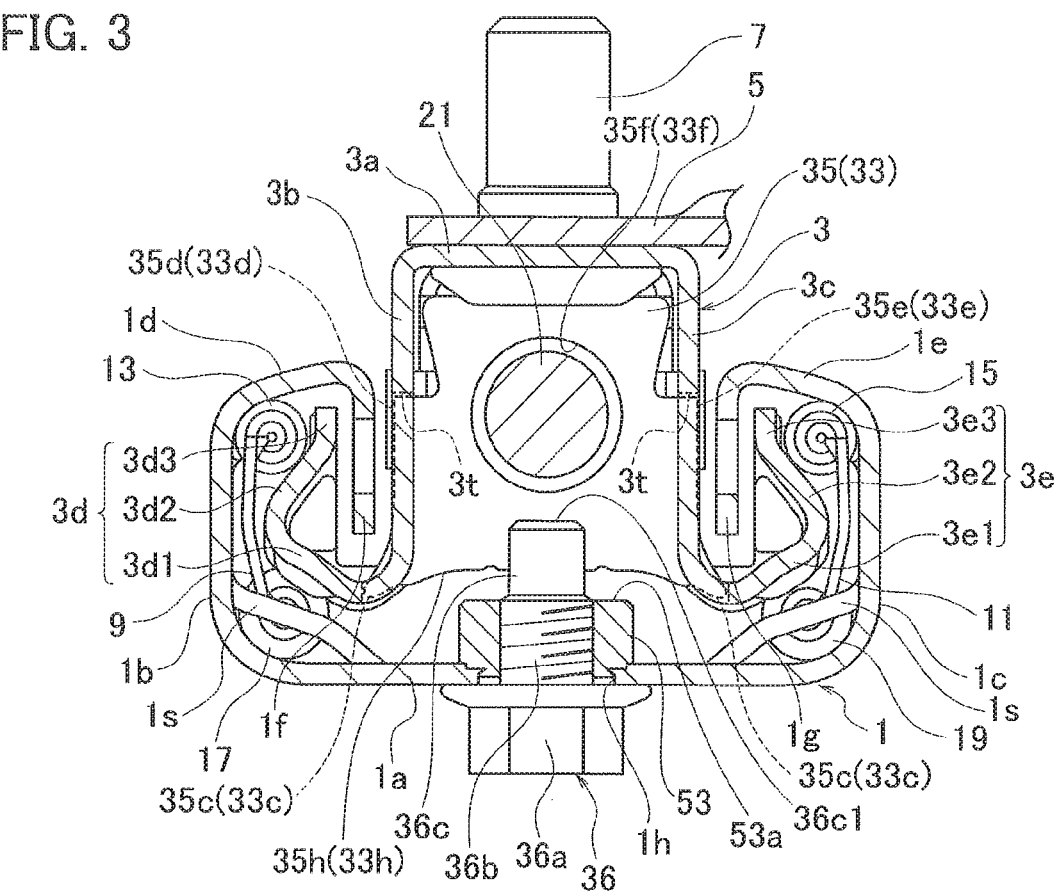
FIG. 3 is a sectional view taken along the line III-III in FIG. 1.

FIG. 3 is a sectional view taken along the line III-III in FIG. 1. As shown in FIG. 3, the lower rail 1 includes a bottom wall 1a, side walls 1b and 1c, upper inclined walls 1d and 1e, and inner walls 1f and 1g. The side walls 1b and 1c extend upward from both sides of the bottom wall 1a in the left-right direction. The upper inclined walls 1d and 1e extend from upper ends of the side walls 1b and 1c and are inclined inwardly and obliquely upward. The inner walls 1f and 1g extend downward from inner ends of the upper inclined walls 1d and 1e, and are provided substantially in parallel with the side walls 1b and 1c. The lower rail 1 is fixed to the floor of the vehicle body through attachments such as a plurality of brackets (not shown).

The upper rail 3 includes a top wall 3a, side walls 3b and 3c, and folded portions 3d and 3e.

The side walls 3b and 3c extend downward from both sides of the 3a in the left-right direction. The folded portions 3d and 3e are bent from lower ends of the side walls 3b) and 3c toward the left outside and right outside. The folded portions 3d and 3e include lower inclined portions 3d1 and 3e1, upper inclined portions 3d2 and 3e2, and vertical walls 3d3 and 3e3. The lower inclined portions 3d1 and 3e1 extend outward and upward from the lower ends of the side walls 3b and 3c. The upper inclined portions 3d2 and 3e2 extend inward and upward from the lower inclined portions 3d1 and 3e1 toward the side walls 3b and 3c. The vertical walls 3d3 and 3e3 extend upward from the upper inclined portions 3d2 and 3e2 substantially parallel to the side walls 3b and 3c. The top wall 3a of the upper rail 3 is fixed to a fixture 5 such as a bracket provided on the seat by fasteners 7.

An upper guide ball 13 and a lower guide ball 17, which are supported by retainer 9 is rotatably housed in a space between the periphery of the side wall 1b of the lower rail 1 and the folded portion 3d of the upper rail 3. Similarly, An upper guide ball 15 and a lower guide ball 19, which are supported by a ball retainer 11 is rotatably housed in a space between the periphery of the side wall 1c of the lower rail 1 and the folded portion 3e of the upper rail 3. When the upper rail 3 moves in the front-rear direction with respect to the lower rail 1, the upper guide balls 13 and 15 and the lower guide balls 17 and 19 rotate. Accordingly, a friction between the rails 1 and 3 can be suppressed and a smooth movement of the upper rail 3 can be achieved. As shown in FIG. 2, fixed stoppers 1s are formed on the left and right sides of the front and rear ends of the lower rail 1 and on the left and right sides of the middle portion of the lower rail 1. The fixed stopper 1s prevents the ball retainers 9 and 11 holding the upper guide balls 13 and 15 and the lower guide balls 17 and 19 from being disengaged and displaced.

A screw shaft 21 is arranged in a space inside the upper rail 3. The screw shaft 21 extends along a moving direction (i.e. longitudinal direction) of the upper rail 3. The screw shaft 21 has almost the same length as the upper rail 3 and is attached to the upper rail 3. A nut member 23 is attached to the bottom wall 1a. The nut member 23 is located slightly rearward from the center of the lower rail 1 in the longitudinal direction. The nut member 23 is formed to be long in the front-rear direction, and is mounted on the bottom wall 1a by a attachment bolt 20 inserted from below the outside of the bottom wall 1a. The nut member 23 has a female screw portion with which the male screw portion 21a of the screw shaft 21 is screwed. Accordingly, as the screw shaft 21 rotates, the screw shaft 21 (upper rail 3) moves in the front-rear direction (the left-right direction in FIG. 1) with respect to the nut member 23 (lower rail 1).

The screw shall 21 is rotationally driven by a drive unit 29 including a motor 25 and a gear box 27. The drive unit 29 is attached to the upper rail 3. For example, the drive unit 29 is fixed to the front end of the upper rail 3 in the longitudinal direction by riveting pins 31. A pair of mounting plates 3f is formed at the front end of the upper rail 3. An attachment portion 27a of the gear box 27 is inserted between the mounting plates 3f. In this state, each riveting pin 31 is inserted into an attachment hole 27a1 of the attachment portion 27a and insertion holes 3f1 of the mounting plate 3f. A tip end of the riveting pin 31 projecting to the opposite side is deformed by riveting manner, and thereby the drive unit 29 is fastened.

A serration 21b is formed on a front end of the screw shaft 21. The screw shaft 21 is connected with the drive unit 29 by coupling the front end having the serrations 21b to a worm wheel (not shown) in the gear box 27. The electric seat slide devices except for the motor 25 are provided at the left and right positions of the seat. The front portions of the upper rails 3, one of which is depicted as the left end in FIG. 2, are linked to each other with a drive shaft (not shown). The single motor 25 is provided at the drive shaft for example. An output shaft of the single motor 25 is coupled to input shafts (not shown) of the left and right gear boxes 27, thereby the respective screw shafts 21 are synchronously driven via the gear box 27.

A stopper plate 33 and a stopper plate 35 are attached to a front part of the upper rail 3 and a rear part of the upper rail 3, respectively. The stopper plates 33, 35 are formed in a plate shape substantially orthogonal to the screw shaft 21, and are disposed inside the upper rail 3 so as to bridge between the left and right side walls 3b and 3c of the upper rail 3. The stopper plates 33, 35 have projections 33a, 35a formed in the center of the upper part. The stopper plates 33, 35 have lower claws 33c, 35c formed in the lower part. While the lower claws 33c and 35c are fitted into the slits 3t formed in the upper rail 3, the projections 33a and 35a are fitted into the holes 3a1 formed in the top wall 3a of the upper rail 3 and are fixed by caulking.

In addition to the lower claws 33c and 35c, the stopper plates 33 and 35 may be provided with upper claws on both left and right sides of the projections 33a and 35a, and the upper claws may be fitted into the slits formed in the upper rail 3. As a result, the mounting strength of the stopper plates 33, 35 to the upper rail 3 is improved. The peripheral portion of the caulking hole 3a1 is formed so as to be recessed downward with respect to the other portion of the top wall 3a of the upper rail 3. Thereby, the upper portions of the stopper plates 33, 35 are set so as not to project above the other parts of the top wall 3a.

As shown in FIG. 3, the left and right side edges 33d (35d) and 33e (35e) on the lower side of the stopper plate 33 (35) is fitted into the slits 3t formed in the left and right side walls 3b, 3c together with the lower claws 33c (35c). The left and right side edges 33d (35d) and 33e (35e) are portions of the stopper plate 33 (35), which is positioned above the center of the stopper plate 33 (35) in the vertical direction and below a position corresponding to the center of the screw shaft 21.

The nut member 23 screwed onto the screw shaft 21 is located between the front and rear stopper plates 33, 35. The stopper plate 33 (35) is provided with a through hole 33f (35f) formed in the center thereof. The screw shaft 21 is inserted into the through holes 33f and 35f. Therefore, the screw shaft 21 is rotatable with respect to the stopper plates 33, 35 while being inserted into the through holes 33f, 35f. When the screw shaft 21 is rotated, the screw shaft 21 and the upper rail 3 move rearward or forward with respect to the nut member 23 (lower rail 1). When they move further forward, the stopper bolt 36 shown in FIG. 3 contacts the rear stopper plate 35. Alternately, when they move further rearward, the nut member 23 contacts the front stopper plate 33. With these contacts, the movement of the upper rail 3 in the front-rear direction is restricted.

The front and rear stopper plates 33, 35 are formed with cylindrical portions 33g, 35g projecting therefrom. The cylindrical portions 33g, 35g are located on sides of the plates opposite to sides on which the plates face each other. The through holes 33f and 35f also penetrate the cylindrical portions 33g and 35g. Bearing nuts 37 and 39 are located on the side facing the cylindrical portions 33g and 35g with a predetermined gap therebetween. The bearing nuts 37, 39 are fixed to the screw shaft 21 by crimping while being screwed onto a male screw portion 21a of the screw shaft 21. The crimping is made by pressing plural positions on the outer peripheries of the bearing nuts 37, 39 toward the shaft center through the male screw portion 21a.

The stopper plates 33 and the bearing nut 37 constitute a load transmitting section 41. When an impact load toward the front of the vehicle body acts on the upper rail 3 due to a collision of the vehicle or the like, the front stopper plate 33 moves to the front of the vehicle body, so that the stopper plate 33 collides with the bearing nut 37 at the front of the stopper plate 33. Therefore, it is possible to prevent the impact load from being directly transmitted from the upper rail 3 to the gear box 27 coupled to the upper rail 3. As a result, it is possible to suppress the impact load transmitted to the gear box 27 from acting on the gear box 27 to separate the gear box 27 from the screw shaft 21. At this time, a tensile force acts on the screw shaft 21.

The stopper plate 35 and the bearing nut 39 constitute a load transmitting section 43. When an impact load toward the rear of the vehicle body acts on the upper rail 3, the rear stopper plate 35 collides with a bearing nut 39 at the rear of the stopper plate 35. Therefore, it is possible to prevent the impact load from being directly transmitted from the upper rail 3 to the gear box 27 connected to the upper rail 3. This prevents the impact load from being transmitted to the gear box 27 and the gear box 27 from pressing the screw shaft 21. Also at this time, a tensile force acts on the screw shaft 21.

A rear end portion 21c of the screw shaft 21 is rotatably supported by a bearing portion 45a of an end cap 45 while the screw shaft 21 is disposed in the upper rail 3. The end cap 45 includes a pair of left and right engaging claws 45b and 45h provided on the outer periphery of the bearing portion 45a. The pair of the engaging claws 45b and 45b are engaged with engagement holes 3h formed in the side walls 3b and 3c of the upper rail 3, thereby the end cap 45 is attached to the upper rail 3. A male screw is formed on a front end portion 21d of the screw shaft 21. The male screw is located further forward than the serration 21b, and a nut 47 is screwed into the male screw. Reference numerals 49 and 51 represent washers.

Figure 5:
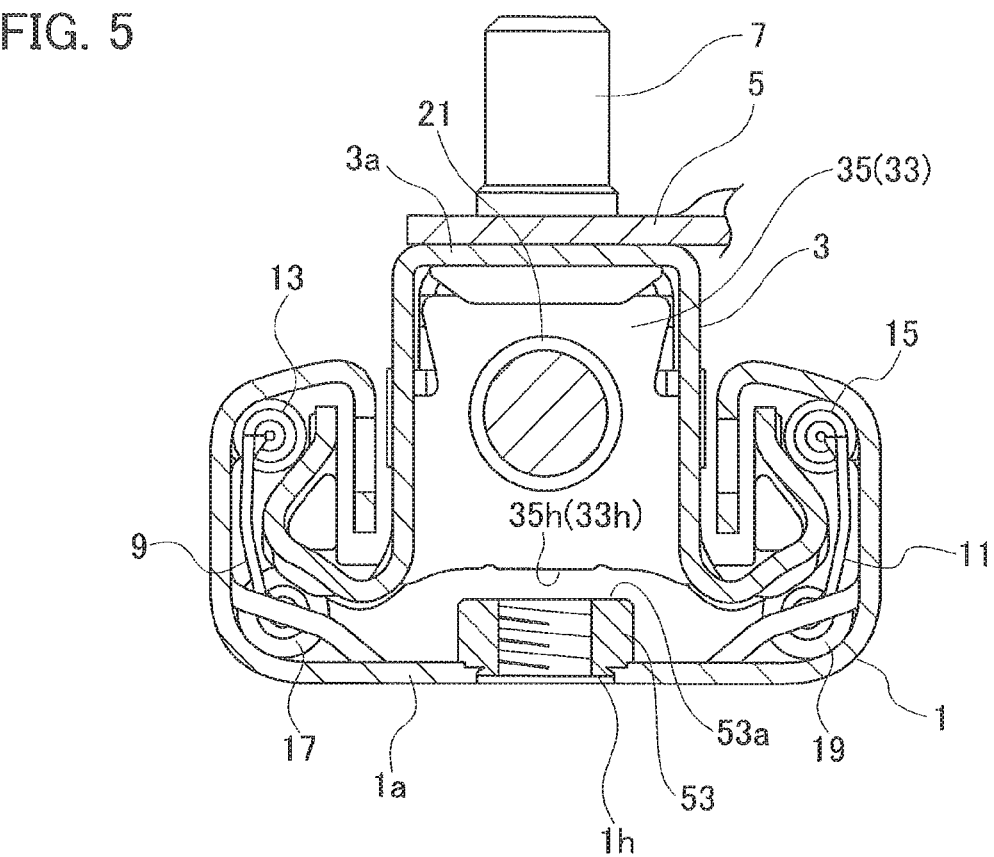
FIG. 5 is a cross-sectional view before attaching the stopper bolt, as similar to FIG. 3.

As shown in FIG. 2, the aforementioned stopper bolt 36 is attached to the bottom wall 1a of the lower rail 1. The stopper bolt 36 is provided between the nut, member 23 and the stopper plate 35, and is located, for example, near the rear side of the nut member 23. A bolt insertion hole 1h is formed in the bottom wall 1a for the stopper bolt 36 to be attached. The stopper bolt 36 is inserted into the bolt insertion hole 1h from the below of the bottom wall 1a. A fixing nut 53 is fixed to a position on an inner surface of the bottom wall 1a, which corresponds to the bolt insertion hole 1h. The fixing nut 53 may be fixed to the bottom wall 1a by press fitting or the like to the bolt insertion hole 1h. That is, in this case, the fixing nut 53 is a clinching nut. FIG. 5 shows a state in which the fixing nut 53 is press-fitted and fixed to the bottom wall 1a, and is a state before the stopper bolt 36 is attached.

The bolt, insertion hole 1h has an inner diameter larger than that of a screw hole of the fixing nut 53. A center of the bolt insertion hole 1h and a center of the screw hole of the fixing nut 53 are substantially coincident with each other. The stopper bolt 36 is inserted into the bolt insertion hole 1h from below in the state as shown in FIG. 5, and is fastened to the fixing nut 53, thereby fixed to the lower rail 1 as shown in FIG. 3. The stopper bolt 36 includes a head portion 36a, a screw portion 36b, and a stopper portion 36c. The head portion 36a is located outside of the lower rail 1 and below the bottom wall 1a. The screw portion 36b is a male thread screwed into the fixing nut 53. The stopper portion 36c is located at the tip of the stopper bolt 36. That is, the stopper portion 36c is located on the side opposite to the head portion 36a with respect to the screw portion 36b.

As shown in FIG. 3, the stopper plates 33 and 35 have lower edges 33h and 35h that are concaved (recessed) upward. However, the lower edges 33h and 35h may be flat instead of being concaved. The lower edges 33h and 35h are located above an upper end portion 53a of the fixing nut 53. That is, the upper end portion 53a of the fixing nut 53 is located below and separated from the lower end portions (lower edges 33h and 35h) of the stopper plates 33, 35 with a predetermined gap in the vertical direction.

Figure 4:
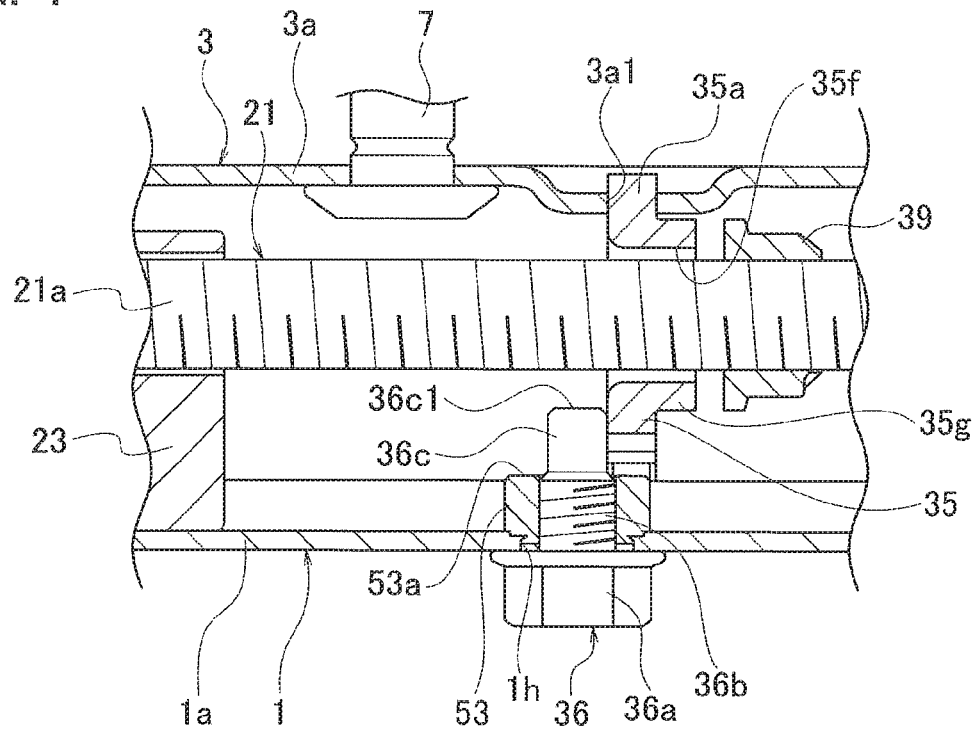
FIG. 4 is a cross-sectional view showing a state where the stopper portion of the stopper bolt is in contact with the rear stopper plate.

On the other hand, a tip end portion 36c1 of the stopper portion 36c of the stopper bolt 36 is located above the lower edges 33h and 35h of the stopper plates 33 and 35. The lower edges 33h and 35h are located substantially at the center of the stopper portion 36c in the vertical direction. Therefore, the stopper portion 36c of the stopper bolt 36 contacts the stopper plate 35 when the upper rail 3 moves relative to the lower rail 1 together with the screw shaft 21 in the axial direction of the screw shaft 21 by the rotation of the screw shaft 21. FIG. 4 shows a state in which the stopper portion 36c of the stopper bolt 36 is in contact with the rear stopper plate 35.

Next, the operation of the electric seat slide device will be described.

When the screw shaft 21 rotates with respect to the nut member 23 fixed to the lower rail 1 with the drive of the motor 25, the screw shaft 21 moves forward and rearward with the upper rail 3 with respect to the lower rail 1, and thereby the seat in the front-back direction is determined. When the drive of the motor 25 is continued to further move the upper rail 3 forward for example, the stopper portion 36c contacts the rear stopper plate 35 as shown in FIG. 4, and further forward movement is restricted. A position of the upper rail 3 at which a forward movement of the upper rail 3 is restricted depends on the positions of the stopper bolt 36 and the fixing nut 53. In the present embodiment, these positions can be arbitrarily set between the nut member 23 and the rear stopper plate 35 along the front-rear direction of the upper rail 3. That is, by changing the attachment positions of the stopper bolt 36 and the fixing nut 53, the position of the upper rail 3 at which the forward movement is restricted can be changed. On the other hand, when the upper rail 3 is about to move rearward further by the continuation of drive of the motor 25, the nut member 23 comes into contact with the front stopper plate 33 to restrict the rearward movement of the upper rail 3.

Next, effects of the present embodiment will be described.

In the present embodiment, the upper end portion 53a of the fixing nut 53 is located below and spaced apart from the lower edge 35h of the stopper plate 35 serving as a stopper member in the vertical direction. The stopper bolt 36 includes a stopper portion 36c that comes into contact with the stopper plate 35 when the upper rail 3 moves relative to the lower rail 1 together with the screw shaft 21 in the axial direction by the rotation of the screw shaft 21. In this case, the stopper plate 35 is not a part of the upper rail 3 which is cut and raised from the upper rail 3, but, a plate member fixed to the upper rail 3 by caulking. Therefore, the stopper plate 35 is firmly attached to the upper rail 3, and can have an extremely high mechanical strength. The stopper plate 33 is attached to the upper rail 3 in the same manner as the stopper plate 35, and can also have an extremely high mechanical strength.

The excessive movement (e.g. excessive forward movement) of the upper rail 3 with respect to the lower rail 1 is restricted by the contact of the high rigid stopper plate 35 to the stopper bolt 36 attached to the lower rail 1. Since the stopper bolt 36 sandwiches the bottom wall 1a of the lower rail 1 from above and below with the fixing nut 53, it is firmly fixed to the lower rail 1. Therefore, the strength of the stopper portion 36c becomes extremely high, and the inclination and deformation of the stopper portion 36c due to the contact to the stopper plate 35 can be suppressed.

In order to restrict the excessive movement (e.g. excessive forward movement) of the upper rail 3 with respect to the lower rail 1, it just enough to attach the stopper bolt 36 and the fixing nut 53 to the lower rail 1. This is a simple structure, and thus the production cost can be reduced.

As described above, the upper end portion 53a of the fixing nut 53 is located below the lower edges 33h and 35h of the stopper plates 33 and 35. Therefore, it is possible to assemble the lower rail and the upper rail 3 even in a state where the fixing nut 53 is already fixed to the lower rail 1 before the stopper bolt 36 is attached to the lower rail 1. Specifically, when the lower rail 1 and the upper rail 3 are assembled to each other by the sliding manner in the longitudinal direction, the fixing nut 53 and the stopper plates 33 and 35 do not interfere with each other.

The operation of fixing the fixing nut 53 to the lower rail 1 can be performed in the process of attaching the nut member 23 to the lower rail 1 with the attachment bolt 20. Therefore, it is possible to assemble a component (fixing nut 53) that restricts the moving (sliding) range of the upper rail 3 by using the stopper bolt 36 even on a conventional manufacturing line on which the stopper bolt 36 is not used, thus improving productivity. The stopper bolt 36 is fastened to the fixing nut 53 as the final work after attaching the screw shaft 21 and the drive unit 29 to the assembly of the lower rail 1 and the upper rail 3.

The stopper members according to the present embodiment are the front and rear stopper plates 33, 35 serving as a pair and having a predetermined interval in the axial direction of the screw shaft 21. The nut member 23 is arranged between the pair of stopper plates 33 and 35. The fixing nut 53 (fixing nut 55 as described later (see FIG. 6)) and the stopper bolt 36 are provided between the nut member 23 and at least one of the stopper plates 33 and 35. In the example in which the stopper bolt 36 is provided between the rear stopper plate 35 and the nut member 23 as shown in FIG. 1, the stopper bolt 36 contacts the rear stopper plate 35 when the upper rail 3 moves forward. Accordingly, it is possible to restrict the excessive forward movement of the upper rail 3.

In the present embodiment, the rail bodies each constituted of the lower rail 1 and the upper rail 3 are provided on the left and right as a pair. The nut member 23 and the screw shaft 21 are provided on each of the rail bodies, and the screw shafts 21 of the rail bodies are synchronously driven by the single motor 25. A fixing nut 53 and a stopper bolt 36 are provided on at least one of the left and right rail bodies.

The fixing nut 53, the stopper bolt 36, and the stopper plate 35 constitute a stopper structure. Since this stopper structure is mechanically strong, it is possible to stably restrict forward movement of the seat even when the fixing nut 53 and the stopper bolt 36 are provided only on one of the left and right rail bodies. That, is, since it is not necessary to provide the fixing nut 53 and the stopper bolt 36 on both of the rail bodies, the cost can be reduced. However, the fixing nut 53 and the stopper bolt 36 may be provided on both the left and right rail bodies.

The fixing nut 53 according to the present embodiment may be a press-fit nut fixed to the lower rail 1 by press-fitting. In this case, since the fixing nut 53 is press-fitted and fixed in the bolt insertion hole 1h of the lower rail 1, the fixing nut 53 can be prevented from coming off, and the attachment process of the fixing nut 53 can be easily added to the production line, and thus the increased of the production cost can be suppressed. The fixing nut 53 firmly sandwiches the bottom wall 1a of the lower rail 1 with the stopper bolt 36, so that the mechanical strength of the stopper structure can be further increased.

The lower rail 1 according to the present embodiment is clamped and fixed by the fixing nut 53 and the head portion 36a of the stopper bolt 36 by fastening the stopper bolt 36 to the fixing nut 53. That is, it is possible to clamp the bottom wall 1a of the lower rail 1 from upper and lower only by fastening the stopper bolt 36 to the fixing nut 53.

Figure 6:
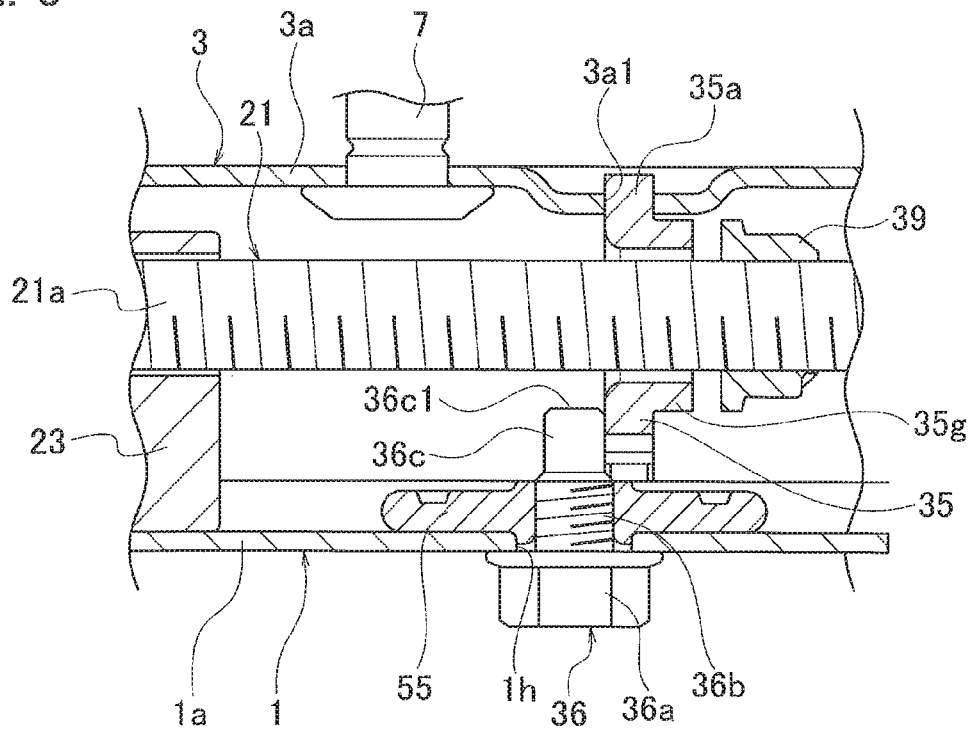
FIG. 6 is a cross-sectional view corresponding to FIG. 4 when the fixing nut is a weld nut.

As shown in FIG. 6, a fixing nut 55 to be welded may be used instead of the fixing nut 53 to be press-fitted as shown in FIG. 4. The fixing nut 55 is a weld nut formed into a disk-shape. The fixing nut 55 is fixed on the bottom wall 1a of the lower rail 1 by welding such as projection welding. As same as the fixing nut 53 as shown in FIG. 4, the screw portion 36b of the stopper bolt 36 is screwed into the fixing nut 55 from below. The fixing nut 55 is integrally fixed to the bottom wall 1a of the lower rail 1 by welding. Therefore, the mounting strength to the lower rail 1 is increased and the mechanical strength of the stopper structure can be further increased.

The embodiments as described above are examples for facilitating the understanding of the present invention, and the present, invention is not limited to the embodiments. The technical scope of the present invention is not limited to the specific technical matters disclosed in the above-described embodiments, but also includes various modifications, changes, alternative techniques and the like that can be easily derived therefrom.

For example, although the fixing nut 53 and the stopper bolt 36 are provided between the rear stopper plate 35 and the nut member 23 in the above embodiment, the fixing nut 53 and the stopper bolt 36 may be provided between the front stopper plate 33 and the nut member 23. In this case, the front stopper plate 33 and the stopper bolt 36 come into contact with each other to restrict the excessive rearward movement of the upper rail 3.

A pair of the fixing nuts 53 and the stopper bolt 36 may be provided between the rear stopper plate 35 and the nut member 23 and between the front stopper plate 33 and the nut member 23.

In the above embodiments, the upper rail 3 is applied (i.e. served as) the first rail to which the screw shaft 21 is attached, and the lower rail 1 is applied to (i.e. served as) the second rail to which the nut, member 23 is attached. However, the lower rail 1 may be applied to (i.e. served as) the first rail, and the upper rail 3 may be applied to (i.e. served as) the second rail. Specifically, in this case, the screw shaft 21 and the stopper plates 33 and 35 are attached to the lower rail 1. On the other hand, the nut member 23, the fixing nut 53 and the stopper bolt 36 are attached to the upper rail 3. Accordingly, by the rotation of the screw shaft 21 provided in the lower rail 1, the nut member 23 moves rearward and forward together with the upper rail 3. In order to restrict the excessive forward movement of the upper rail 3, the stopper bolt 36 is provided between the front stopper plate 33 and the nut member 23. With this, the stopper bolt 36 comes into contact with the front stopper plate 33 to restrict the forward movement of the upper rail 3. Here, the fixing nut 53 and the stopper bolt 36 may be provided between the nut member 23 and the rear stopper plate 35 in the lower rail 1 to restrict the excessive rearward movement of the upper rail 3. Otherwise, in the upper rail 3, a pair of the fixing nuts 53 and the stopper bolt 36 may be provided between the rear stopper plate 35 and the nut member 23 and between the front stopper plate 33 and the nut member 23.

Plural bolt insertion holes 1h for attaching the fixing nut 53 and the stopper bolt 36 may be provided in a bottom or top wall of the second rail (i.e. the bottom wall 1a of the lower rail 1 or the top wall 3a of the upper rail 3) so that they are attached to the required position. Accordingly, the electric seat slide device itself can be commonly used (be applied) for various seats and vehicles for the device to be attached, and the manufacturing cost can be reduced.

What is claimed is:

1. An electric seat slide device comprising:
   at least one rail body including a first rail and a second rail that extend in a longitudinal direction along a front-rear direction of a vehicle, one of the first rail and the second rail movably provided in the longitudinal direction relative to the other of the first rail and the second rail;
   at least one screw shaft rotatably attached to the first rail and extending along the longitudinal direction of the first rail;
   a drive unit attached to the first rail and configured to rotationally drive said at least one screw shaft;
   at least one stopper member attached to the first rail and arranged orthogonal to said at least one screw shaft;
   a nut member attached to the second rail and screwed toe said at least one screw shaft;
   a fixing nut attached to an inner surface of the second rail facing the first rail, the fixing nut being located between the at least one stopper member and the nut member in a state where the first rail and the second rail are assembled to each other; and
   a stopper bolt inserted from an outside of the second rail which is opposite to an inside thereof facing the first rail, the stopper bolt being fastened to the fixing nut, wherein
   an end portion of the fixing nut facing the first rail is separated in a vertical direction from an end portion of the at least one stopper member facing the second rail, and
   the stopper bolt includes a stopper portion that comes into contact with the at least one stopper member when the first rail moves in an axial direction of said at least one screw shaft relative to the second rail together with said at least one screw shaft by a rotation of said at east one screw shaft.

2. The electric seat slide device according to claim 1, wherein
   the at least one stopper member includes a pair of stopper members provided with a predetermined interval in the axial direction of said at least one screw shaft,
   the nut member is arranged between the pair of stopper members, and
   the fixing nut and the stopper bolt are provided between the nut member and one of the pair of stopper members.

3. The electric seat slide device according to claim 2, wherein
   the at least one rail body includes a pair of the rail bodies provided on left and right,
   the at least one screw shaft comprises a pair of screw shafts provided in respective ones of the pair of rail bodies,
   the pair of screw shafts are synchronously driven by the single drive unit, and
   the fixing nut and the stopper bolt are provided on at least one of the pair of rail bodies.

4. The electric seat slide device according to claim 1, wherein
   the at least one rail body includes a pair of the rail bodies provided on left and right,
   said at least one screw shaft comprises a pair of screw shafts provided in respective ones of the pair of rail bodies,
   the pair of screw shafts are synchronously driven by the single drive unit, and
   the fixing nut and the stopper bolt are provided on at least one of the pair of rail bodies.

5. The electric seat slide device according to claim 1, wherein
   the second rail is sandwiched and fixed by the fixing nut and a head portion of the stopper bolt by fastening the stopper bolt to the fixing nut.

6. The electric seat slide device according to claim 1, wherein
   the fixing nut is a weld nut configured to be fixed to the second rail by welding.

7. The electric seat slide device according to claim 1, wherein
   the fixing nut is a press-fit nut configured to be fixed to the second rail by press-fitting.

* * * * *

UNITED STATES PATENT AND TRADEMARK OFFICE
CERTIFICATE OF CORRECTION

PATENT NO. : 11,299,070 B2
APPLICATION NO. : 16/919436
DATED : April 12, 2022
INVENTOR(S) : Toshihiro Kimata et al.

It is certified that error appears in the above-identified patent and that said Letters Patent is hereby corrected as shown below:

In the Claims

Claim 1, Column 9, Line 37, please delete the phrase "and screwed toe" and replace with "and screwed to".

Signed and Sealed this
Twenty-fourth Day of May, 2022

Katherine Kelly Vidal
*Director of the United States Patent and Trademark Office*